United States Patent
Bouillet

(10) Patent No.: US 10,533,530 B2
(45) Date of Patent: Jan. 14, 2020

(54) ROTATING MACHINE AND INSTALLATION FOR CONVERTING ENERGY COMPRISING SUCH A MACHINE

(71) Applicant: Alstom Renwable Technologies, Grenoble (FR)

(72) Inventor: Vincent Bouillet, Vienne (FR)

(73) Assignee: GE Renewable Technologies, Grenoble (FR)

( * ) Notice: Subject to any disclaimer, the term of this patent is extended or adjusted under 35 U.S.C. 154(b) by 0 days.

(21) Appl. No.: 15/516,173

(22) PCT Filed: Sep. 14, 2015

(86) PCT No.: PCT/EP2015/070918
§ 371 (c)(1),
(2) Date: Mar. 31, 2017

(87) PCT Pub. No.: WO2016/050488
PCT Pub. Date: Apr. 7, 2016

(65) Prior Publication Data
US 2017/0306919 A1 Oct. 26, 2017

(30) Foreign Application Priority Data

Oct. 1, 2014 (EP) .................................... 14290295

(51) Int. Cl.
*G01M 15/14* (2006.01)
*F03B 11/00* (2006.01)
*F03D 17/00* (2016.01)

(52) U.S. Cl.
CPC ............ *F03B 11/008* (2013.01); *F03D 17/00* (2016.05); *G01M 15/14* (2013.01);
(Continued)

(58) Field of Classification Search
CPC ....... F03B 11/008; F03D 17/00; G01M 15/14; F05B 2270/807; F05B 2260/80
See application file for complete search history.

(56) References Cited

U.S. PATENT DOCUMENTS 6,494,046 B1 * 12/2002 Hayess ................... F01D 21/00
60/39.091
6,834,539 B2 * 12/2004 Faigle .................. B23Q 17/003
279/4.02

(Continued)

FOREIGN PATENT DOCUMENTS

| CN | 101566136 A | 10/2009 |
| CN | 101929432 A | 12/2010 |

(Continued)

OTHER PUBLICATIONS

Extended European Search Report and Opinion issued in connection with corresponding EP Application No. 14290295.6 dated Mar. 30, 2015.

(Continued)

*Primary Examiner* — Freddie Kirkland, III
(74) *Attorney, Agent, or Firm* — Dority & Manning, P.A.

(57) ABSTRACT

The rotating machine, comprises a shaft and at least one device for measuring at least the accelerations of the shaft along pitch, yaw and roll axes of the shaft or the angular position of the shaft around the pitch, yaw and roll axes, the or each device being mounted on the shaft.

10 Claims, 1 Drawing Sheet

(52) U.S. Cl.
CPC ..... *F05B 2260/80* (2013.01); *F05B 2270/807* (2013.01); *Y02E 10/226* (2013.01)

(56) References Cited

U.S. PATENT DOCUMENTS

| | | | | |
|---|---|---|---|---|
| 7,160,083 | B2* | 1/2007 | Pierce | F03D 7/0204 |
| | | | | 415/118 |
| 9,134,199 | B2* | 9/2015 | Hwang | G01M 15/14 |
| 9,459,179 | B2* | 10/2016 | Brenner | G01H 1/003 |
| 9,874,107 | B2* | 1/2018 | Falb | F03D 17/00 |
| 2003/0071526 | A1* | 4/2003 | Faigle | B23Q 17/003 |
| | | | | 310/68 B |
| 2011/0285129 | A1* | 11/2011 | Li | F03D 1/06 |
| | | | | 290/44 |
| 2012/0303277 | A1 | 11/2012 | Fu | |
| 2015/0052985 | A1 | 2/2015 | Brenner et al. | |
| 2015/0118047 | A1* | 4/2015 | Yoon | F03D 17/00 |
| | | | | 416/1 |

FOREIGN PATENT DOCUMENTS

| | | |
|---|---|---|
| CN | 102032112 A | 4/2011 |
| CN | 102086842 A | 6/2011 |
| CN | 202152713 U | 2/2012 |
| CN | 102797634 A | 11/2012 |
| CN | 102840882 A | 12/2012 |
| DE | 10 2011 117 468 A1 | 5/2013 |
| EA | 200970473 A1 | 12/2009 |
| EP | 1 959 127 A2 | 8/2008 |
| GB | 2 372 783 A | 9/2002 |
| JP | 1985-104732 U1 | 7/1985 |
| JP | 1997-119861 A | 5/1997 |
| JP | 2001-349775 A | 12/2001 |
| RU | 2 471 087 C2 | 12/2012 |
| WO | 2013/110215 A1 | 8/2013 |

OTHER PUBLICATIONS

International Search Report and Written Opinion issued in connection with corresponding PCT Application No. PCT/EP2015/070918 dated Nov. 25, 2015.
International Preliminary Report on Patentability issued in connection with corresponding PCT Application No. PCT/EP2015/070918 dated Apr. 4, 2017.
Machine translation and First Office Action and Search issued in connection with corresponding CN Application No. 201580053533.9 dated May 28, 2018.
Office Action and Search Report issued in connection with corresponding RU Application No. 2017108165 dated Jan. 17, 2019 (English Translation Not Available).
Preliminary Rejection Notification issued in connection with corresponding JP Application No. 2017-515212 dated Jan. 15, 2019.

* cited by examiner

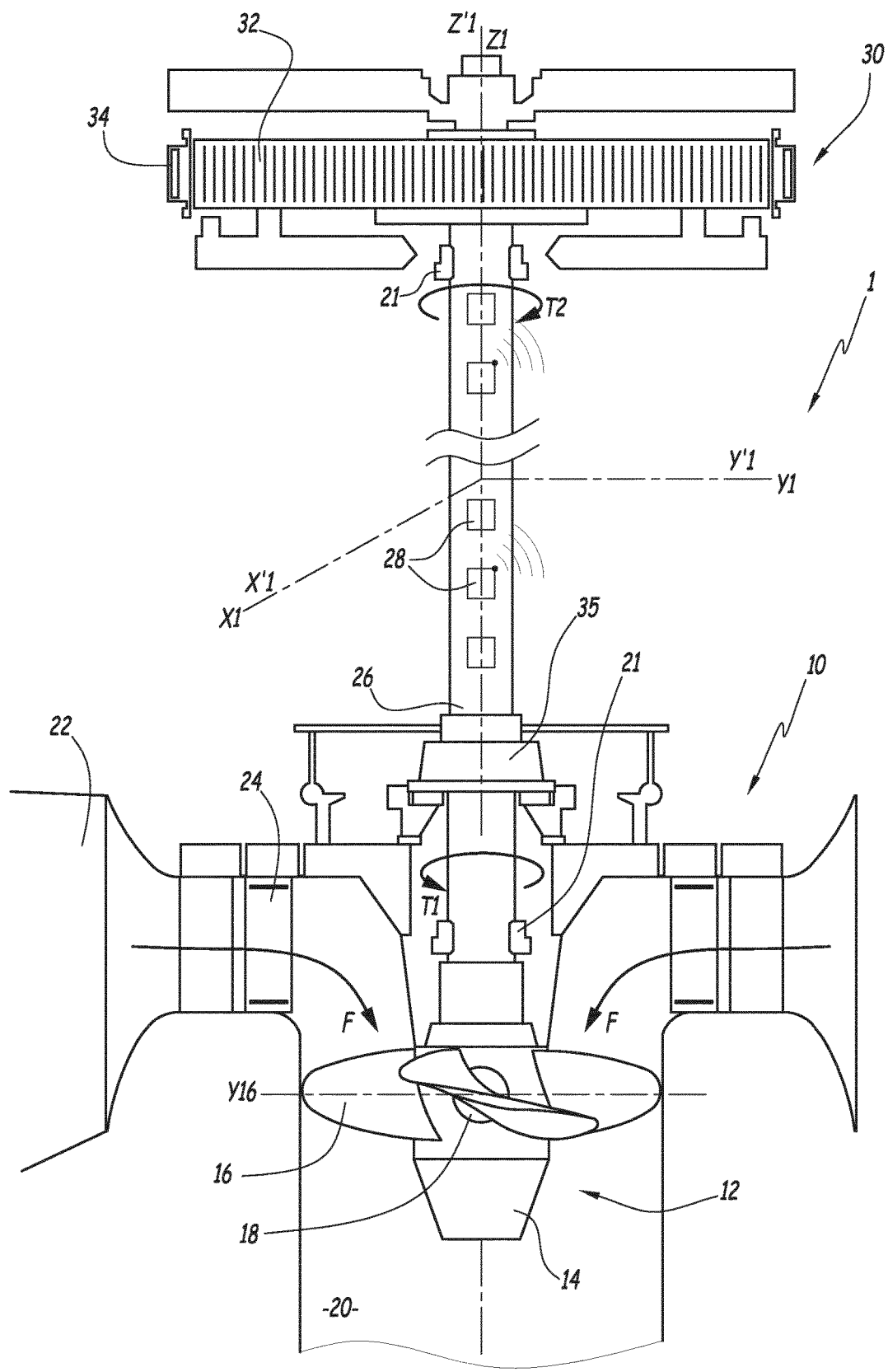

ROTATING MACHINE AND INSTALLATION FOR CONVERTING ENERGY COMPRISING SUCH A MACHINE

FIELD OF THE INVENTION

The invention relates to a rotating machine, such as a turbine, a pump or a pump-turbine. The invention also relates to an installation for converting hydraulic energy into electrical or mechanical energy, and reciprocally. Embodiments of the invention could also be applied to gas, steam or wind turbines.

BACKGROUND

An installation for converting hydraulic energy into electrical energy includes at least a turbine, having a shaft connected at a first end to a runner, which is the rotating part of the turbine. The installation also includes a generator for connecting the turbine to the grid. The generator has a rotor that is connected at a second end of the shaft. The shaft is then subjected, at its first end, to a positive torque exerted by the runner and, at its second end, to a negative torque exerted by the generator. The turbine shaft is supported and guided in rotation by fluid bearings. An oil film is radially interposed between the shaft and a rigid body of the bearing.

The turbine shaft has an elongated shape. Its length may indeed exceed 20 meters. As a result, any defect in the machine leads to important shaft vibrations under the excitation formed by the torques applied at both ends of the shaft. Typical defects are shaft misalignments within the bearings, cracks, machine unbalance, shaft flexion, torsion.

It is then important to monitor the shaft vibrations so as to evaluate the operating status of the machine. For example, new machines vibrate less than older machines. A method consists in equipping fluid bearings with displacement probes so as to measure the radial clearance between the shaft and the bearing rigid body. This allows preventing the shaft from crushing the bearing oil film. Accelerometers (or velocity probes) can also be embedded on the shaft bearings so as to determine the efforts exerted by the shaft on the bearings along the three directions of a local space reference.

SUMMARY

The above explained approach offers a first estimation of the machine operating status. However, it is not possible to measure the modal response of the shaft under excitation around yaw, pitch and roll axes respectively. As a result, shaft torsion, flexion or axial pumping behaviour are difficult to detect and to evaluate since the shaft internal momentums cannot be determined. Furthermore, the proximity probes and accelerometers (or velocity probes) attached to the shaft bearings do not measure directly the shaft vibrations that should be evaluated in an embedded rotating reference axes system. This means that the acceleration and clearance representative signals include a lot of noise.

Besides, in order to increase the turbine performance, it is known to reduce as much as possible the clearance between the rotor and the stator. However, the shaft vibrations may imply the rotor to contact the stator. This is called rub phenomenon. Rub phenomenon is difficult to detect using known vibrations monitoring methods as it is often hidden by ambient noise. It can lead to bearing failures, thereby inducing long, expensive and unplanned outages.

Embodiments of the invention overcome these drawbacks by proposing a rotating machine that can be better monitored.

In embodiments of the invention, the data measured by the or each measuring device mounted on the shaft leads to a complete knowledge of the machine shaft dynamic behavior. Indeed, the modal or forced responses around the pitch, yaw and roll axes can be determined thanks to the measuring devices, on the basis of the measured angular positions and of the measured accelerations. It is then possible to detect, amongst others, shaft torsion, abnormal bending or rub phenomenon. Furthermore, given that the shaft is the most vibrating machine component due to its elongated shape, using measuring devices directly mounted on the shaft allows reducing the noise as the measure is performed directly on the vibrations source, that is the shaft. The amplitude and the frequency of the measured vibrations may be compared to that of a new machine under the same excitation conditions or to that obtained from numerical simulations, such as a finite element simulation. The machine defect can then be identified and preventive actions can be set up to fix the defect and avoid a complete machine failure. For instance, a defective component can be replaced or repositioned.

BRIEF DESCRIPTION OF THE DRAWINGS

These and other features and aspects of the present disclosure will become better understood when the following detailed description is read with reference to the accompanying drawings in which like characters represent like parts throughout the drawings, wherein:

FIG. 1 is an installation 1 of a rotating machine.

DETAILED DESCRIPTION

An embodiment of the invention will now be explained in correspondence with FIG. 1, showing a schematic section of an installation for converting energy that includes a rotating machine according to embodiments of the invention, and as an illustrative example, without restricting the object of the invention.

FIG. 1 represents an installation 1 for converting hydraulic energy into electrical energy. The installation 1 includes a rotating machine 10 that is, in the example, a hydraulic machine, in particular a Kaplan turbine. The Kaplan turbine 10 includes a runner 12 that is configured to rotate around a vertical axis Z1 in operating conditions and that includes a hub 14 equipped with a series of movable runner blades 16.

Coupling flanges 18 connect each a runner blade 16 to the hub 14. Coupling flanges 18 allow swiveling the runner blades 16 each around an axis Y16 that is radial to axis Z1 so as to adjust the machine operating point. For instance, the runner blades 16 may be swiveled to adjust the runner rotation speed, especially to synchronize the hydraulic machine 10 with the grid or change the load once synchronized.

The runner 12 is housed in the upper part of a draft tube 20 that is designed for evacuating water downstream and for increasing the efficiency of turbine 10. A volute 22 is arranged around the runner 12 and is fed with water at high velocity. Indeed, the volute 22 is usually connected to a non-represented penstock that extends from a non-represented upstream reservoir. As a result, water outbursts in the volute 22 with a high potential energy. Water flows afterwards between the blades 16 of runner 12, thereby inducing the runner 12 to rotate. The flow rate of water circulating around the runner 12 is regulated by means of guide vanes 24 that are disposed in a circular pattern within volute 22. The guide vanes 24 are each pivotable around an axis parallel to axis Z1 to reduce or increase the flow rate of water entering the turbine 10.

Consequently, turbine 10 is a double-regulated turbine as it includes two means of regulation linked together, respectively the guide vanes 24 and the movable blades 16. On FIG. 1, the water flow circulating through turbine 10 is represented by arrows F.

The runner 12 is secured at a first end of a rotating shaft 26 that is centered on axis Z1. On FIG. 1, the shaft 26 is represented partially in length. A generator rotor 32 is connected at a second end of the shaft 26, which is opposed to the first end thereof in the longitudinal direction of the shaft 26, that is along axis Z1. The rotor 32 is disposed coaxially within a stator 34 of a generator 30.

In operating conditions, the runner 12 exerts on the first shaft end a positive torque T1 and the generator 30 exerts on the second shaft end a negative torque T2. The torques T1 and T2 are applied on axis Z1. In the example, the runner 12 acts as an engine while the generator 30 acts as a brake.

For the clarity of the specification, an embodiment of a Cartesian system of axes X'1, Y'1 and Z'1 is represented on FIG. 1. This Cartesian system of axes X'1, Y'1 and Z'1 is fixed.

The axis Z1 represents a roll axis of the shaft 26. X1 and Y1 denote two axes that are perpendicular to each other and that are radial to axis Z1. The axis X1 represents a pitch axis of the shaft 26 and the axis Y1 represents a yaw axis of the shaft 26. The axes X1, Y1 and Z1 are intrinsic to the shaft 26, which means that they form a system of axes that is moving relative to the Cartesian system of axes when the shaft 26 rotates around any axis X1, Y1 or Z1.

Fluid bearings 21 and 35 are disposed around the shaft 26. In the example of FIG. 1, two fluid bearings 21 are disposed at the ends and a thrust bearing 35 is disposed in the middle of the shaft 26. The fluid bearings 21 disposed at the ends of the shaft are guide bearings that guides the shaft 26 in rotation around axis Z1. The fluid bearing 35 disposed in the middle of the shaft is a thrust bearing that support the shaft 26 in rotation around axis Z1. The guide bearing and the thrust bearings include a body and an oil film that is respectively radially or axially interposed between the shaft and the bearing body.

The shaft of a new hydraulic machine or of a refurbished hydraulic machine does not vibrate very much in standard operating conditions. However, wear, damaged components or specific transient hydraulic phenomena can lead to important or abnormal shaft vibrations. For example, transient hydraulic phenomena arise during the machine start up and the stop of the machine. Transient hydraulic phenomena also arise when switching the machine in pump or turbine mode or when changing the load, i.e the torque T1, by moving the guide vanes 24 and/or the runner blades 16. Another hydraulic transient phenomenon is when the hydraulic turbine is set in discharge mode for discharging floods. In the present document, shaft vibrations correspond to displacements or rotations of the shaft 26, respectively along or around the pitch, yaw and roll axes. As the turbine shaft 26 has an elongated shape and a length that may exceed 20 meters, any defect in the shaft or in the machine results in important shaft vibrations under the excitation formed by the torques T1 and T2 applied at the two shaft ends and by other failure or transient excitations. Transient excitations may come from transient hydraulic phenomena described here-above. The frequency and the amplitude of the shaft vibrations response depend on the excitation frequency and/or amplitude.

Typical failures are shaft misalignment within the fluid bearings 21, shaft cracks, machine unbalance, shaft flexion. The vibrations may lead to a mechanical failure or to bearing damages due to rub phenomenon.

It is then important to monitor turbine 10 so as to detect when the hydraulic machine 10 develops an incipient failure. To this end, measuring devices 28 are mounted on the shaft 26. More precisely, the devices 28 are embedded on the external surface of shaft 26. They are evenly distributed along the shaft 26. The devices 28 allow measuring the accelerations of the shaft 26 along the pitch, yaw and roll axes, respectively X1, Y1 and Z1, and the angular position of the shaft 26 around the pitch, yaw and roll axes. Depending on the shaft length, only one measuring device 28 may be used.

The angular position of the shaft 26 around the roll axis Z1 is defined as the angle between the axes X1 and X'1 or between the axes Y1 and Y'1. The angular position of the shaft 26 around the pitch axis X1 is defined as the angle between the axes Z1 and Z'1 or between the axes Y1 and Y'1. The angular position of the shaft 26 around the yaw axis Y1 is defined as the angle between the axes Z1 and Z'1 or between the axes X1 and X'1. In the configuration of the FIG. 1, the axes X1, Y1 and Z1 are respectively confounded with the axes X'1, Y'1 and Z'1. As a result, the shaft 26 is in a reference position wherein the angle of the shaft 26 around any of the pitch, yaw and roll axes is null.

Each device 28 includes a triaxial accelerometer and a triaxial gyrometer. The triaxial gyrometer may be a fiber optic or MEMS based gyrometer. The devices 28 are each able to communicate with a non-represented monitoring system using wireless technology, such as Wi-Fi or Bluetooth technology, as represented by the airwaves emanating from two devices 28 on FIG. 1. The devices 28 may also communicate with the monitoring system using slip rings.

The monitoring system can determine the rotational speed and the rotational acceleration around the pitch, yaw and roll axes on the basis of the measured angular positions around these axes. This can be performed by a calculator that is integrated in the gyrometers or in the monitoring system and that is able to differentiate one or more times the angular positions with regards to the time. In the same manner, the speed and the displacement of the shaft 26 along the pitch, roll and yaw axes can also be determined by integrating one or two times the measured accelerations along these three axes. The shaft internal forces may be deduced from the accelerations of the shaft 26 along pitch, yaw and roll axes and the shaft internal momentums may be deduced from the rotation speed of the shaft 26 around the pitch, yaw and roll axes. Therefore, the monitoring unit can, on the basis of the information transmitted by the measuring devices 28, output the complete dynamic behavior of the turbine shaft.

The health condition of the hydraulic machine 10 may be then assessed. For instance, the dynamic behavior of the turbine shaft 26 may be compared to that of a shaft belonging to a new or a refurbished turbine. The vibrations level may also be compared to that normally expected for the age of the turbine 10 or to that obtained by theoretical calculation, such as a finite element simulation.

For instance, the monitoring unit may include an embedded data processing system that takes as input vibrations threshold values that come from engineer knowledge. These input vibrations threshold values are specific frequency bandwidths and maximum amplitudes of the shaft vibrations. The monitoring system can then alert when vibration amplitudes or frequency are outside these vibrations threshold values, i.e when the hydraulic machine 10 is malfunctioning. The monitoring system is therefore able to process the measures received from the devices 28 so as to detect a machine failure.

Here-below are detailed potential applications of the measuring devices 28 coupled to the monitoring system.

The measuring devices 28 may be used to detect shaft cracks or coupling failure. In practice, cracks along the shaft 26 are detected by evaluating the rotation speed variations around the pitch and roll axes during a few rotations of the shaft 26. The rotation speed variations are induced by the variation of the shaft stiffness when the crack is alternatively opened and closed during the rotation. Given that the devices 28 are evenly distributed along the shaft 26, it is also possible to determine which segment of the shaft 26 is the most impacted. Consequently, the crack may be localized in an approximate manner, i.e between two adjacent devices 28. To this end, the monitoring system may include an embedded data processing system, for example a field programmable gate array (FPGA), that is able to process the data sent by each device 28 and to localize approximately the input excitation. The input excitation corresponds to the most vibrating segment of shaft 26. The monitoring system is therefore able to locate the shaft defect by comparing the measures received from the different devices 28 distributed along the shaft 26. The closer the devices 28 are to each other, the more precise is the input excitation localization. Generally speaking, at least one device 28 is instrumented for each shaft segment.

The information measured by the devices 28 may also be processed to detect rub phenomenon or to evaluate the shaft yaw response, that is torsion.

Furthermore, the devices 28 can be used to evaluate the phase difference around the axis Z1 between the turbine 10 and the generator rotor 32. Devices 28 may also be useful to assess a shear angle of the shaft 26 for a particular load, i.e a particular torque T1, and compare it with the one expected at said particular load, especially with the one obtained with factory design models. A large gap between the measured shear angle and the expected shear angle at this particular load may indicate a machine failure. Coupling failures may also be detected by measuring the yaw angular position before and after coupling, and inputs can be used for counting, fatigue models and remaining lifetime calculation.

Devices 28 can also be used to detect machine magnetic unbalance by measuring the shaft behavior under radial load induced by rotor excitation.

In case of an installation equipped with a braking system, the working status of the latter may be assessed using devices 28. In particular, it can be determined if the braking system lacks in efficiency or if it presents a hard point.

The shaft dynamic flexion may also be assessed using shaft internal momentums that are deduced from rotation speeds around pitch yaw and roll axes.

A clearance anomaly between the rotor 32 and the stator 34 can also be detected by means of the devices 28. In particular, if the rotor 32 is not concentric with the stator 34 then an electromagnetic force is generated in a direction that will increase the eccentricity. This is called unbalanced magnetic pull. Unbalanced magnetic pull might lead to rub phenomenon that is when the rotor 32 contacts the stator 34.

The shaft vibrations frequency may be analyzed to determine which excitation frequency is present in the vibration spectra. For instance, if it is determined that the shaft segment vibrates strongly at a frequency close to that of the runner 12, one can deduce that the problem comes from the spinning motion of the runner 12.

In a non-represented alternative embodiment, the hydraulic machine 10 may be a pump or a turbine-pump.

In another non-represented alternative embodiment, the hydraulic machine 10 is not a Kaplan turbine but another kind of turbine, such as a Francis, a Pelton or a propeller type turbine.

In another non-represented alternative embodiment, the rotating machine 10 is not a hydraulic turbine but another kind of turbine, such as a gaz, a steam or a wind turbine.

In another non-represented alternative embodiment, the second end of shaft 26 is connected to a mechanical device. In this case, a resistive torque, analog to torque T2, is applied at the second shaft end. This resistive torque represents the load of the mechanical device. The installation 1 converts then hydraulic energy only into mechanical energy.

In another non-represented alternative embodiment, one or more devices 28 measure only the accelerations of the shaft 26 along the pitch, yaw and roll axes.

In another non-represented alternative embodiment, one or more devices 28 measure only the angular position of the shaft 26 around the pitch, yaw and roll axe.

In summary, the devices 28 may include a triaxial accelerometer and/or a triaxial gyrometer.

The technical features of the different embodiments and alternative embodiments of the invention described hereabove can be combined together to generate new embodiments of the invention.

What is claimed is:

1. A hydraulic turbine, comprising;
a rotating shaft; and
a plurality of devices directly mounted to and distributed along the rotating shaft, the plurality of devices measuring at least accelerations of the rotating shaft along pitch, yaw and roll axes of the rotating shaft or an angular position of the rotating shaft around the pitch, the yaw and the roll axes,
wherein the plurality of devices communicate with a monitoring system which locates a shaft defect of the rotating shaft by comparing measurements received from the plurality of devices mounted to and distributed along the rotating shaft.

2. The hydraulic turbine according to claim 1, wherein each of the plurality of devices is embedded on the external surface of the rotating shaft.

3. The hydraulic turbine according to claim 1, wherein each of the plurality of devices communicates with the monitoring system using slip rings or wireless technology.

4. The hydraulic turbine according to claim 1, wherein the monitoring system is able to calculate a rotation speed and a rotation acceleration of the rotating shaft around the pitch, the yaw and the roll axes.

5. The hydraulic turbine according to claim 1, wherein the monitoring system calculates a speed and a displacement of the rotating shaft along the pitch, the yaw and the roll axes.

6. The hydraulic turbine according to claim 1, wherein the plurality of devices are evenly distributed along the rotating shaft.

7. The hydraulic turbine according to claim 1, wherein each of the plurality of devices comprises a triaxial accelerometer or a triaxial gyrometer.

8. The hydraulic turbine according to claim 7, wherein the triaxial gyrometer is a fiber optic or micromechanical systems (MEMS) based gyrometer.

9. An installation for converting hydraulic energy into electrical or mechanical energy, and reciprocally, comprising the hydraulic turbine according to claim 1.

10. A rotating machine, comprising:
a rotating shaft; and
a plurality of devices directly mounted to and distributed along the rotating shaft, the plurality of devices measuring at least accelerations of the rotating shaft along pitch, yaw and roll axes of the rotating shaft or an angular position of the rotating shaft around the pitch, the yaw and the roll axes,
wherein the plurality of devices communicate with a monitoring system which locates a shaft defect of the rotating shaft by comparing measurements received from the plurality of devices mounted to and distributed along the rotating shaft.

* * * * *